United States Patent [19]

Lyons et al.

[11] Patent Number: 5,267,343
[45] Date of Patent: Nov. 30, 1993

[54] ENHANCED RADIATION RESISTANT FIBER OPTICS

[75] Inventors: Peter B. Lyons; Larry D. Looney, both of Los Alamos, N. Mex.

[73] Assignee: The United States of America as represented by the United States Department of Energy, Washington, D.C.

[21] Appl. No.: 940,409

[22] Filed: Sep. 3, 1992

[51] Int. Cl.$^5$ ................................ G02B 6/00
[52] U.S. Cl. .................... 385/141; 65/3.11; 65/30.12; 65/900
[58] Field of Search ........... 65/3.11, 30.12, 900, 65/4.2, 4.21; 385/123, 126, 127, 141

[56] References Cited

U.S. PATENT DOCUMENTS

| | | | |
|---|---|---|---|
| 4,201,561 | 5/1980 | Pierson et al. | 65/30.12 |
| 4,367,918 | 1/1983 | Pinnow | 350/96.30 |
| 4,553,995 | 11/1985 | Chigusa | 65/4.2 |
| 4,669,821 | 6/1987 | Blair et al. | 385/142 |
| 4,733,939 | 3/1988 | Utsumi et al. | 654/3.11 X |
| 4,770,493 | 9/1988 | Ara et al. | 385/128 |
| 4,932,990 | 6/1990 | Michie et al. | 65/3.12 |
| 4,988,162 | 1/1991 | Hayami | 385/142 |
| 5,022,904 | 6/1991 | Ishiguro et al. | 65/3.12 |
| 5,055,121 | 10/1991 | Kanamori et al. | 65/3.12 |
| 5,059,229 | 10/1991 | Blankenship et al. | 65/13 |
| 5,076,825 | 12/1991 | Hayami et al. | 65/4.21 |
| 5,086,352 | 2/1992 | Yamagata et al. | 359/350 |

OTHER PUBLICATIONS

Nagasawa et al., "Improvement of Radiation Resistance of Pure Silica Core Fibers by Hydrogen Treatment" Japanise Jour. of Appl. Ply. vol. 24, No. 9, Sep., 1985.
Lyons et al., SPIE Proceedings, vol. 1174, pp. 2-19, Sep., 1989.

*Primary Examiner*—Frank Gonzalez
*Attorney, Agent, or Firm*—Bruce H. Cottrell; Paul D. Gaetjens; William R. Moser

[57] ABSTRACT

A process for producing an optical fiber having enhanced radiation resitance is provided, the process including maintaining an optical fiber within a hydrogen-containing atmosphere for sufficient time to yield a hydrogen-permeated optical fiber having an elevated internal hydrogen concentration, and irradiating the hydrogen-permeated optical fiber at a time while the optical fiber has an elevated internal hydrogen concentration with a source of ionizing radiation. The radiation source is typically a cobalt-60 source and the fiber is pre-irradiated with a dose level up to about 1000 kilorads of radiation.

3 Claims, 4 Drawing Sheets

ENHANCED RADIATION RESISTANT FIBER OPTICS

FIELD OF THE INVENTION

The present invention relates to the field of optical fibers and more particularly to optical fibers having enhanced radiation resistance. This invention is the result of a contract with the Department of Energy (Contract No. W-7405-ENG-36).

BACKGROUND OF THE INVENTION

High purity silica, with or without selected dopants, is used for optical fiber waveguides due to its high transmission quality and inherent strength. Fibers made from these materials can demonstrate high optical clarity and achieve low transmission losses. This permits the use of optical waveguides of great length, frequently without the need for specialized repeaters or amplifiers, as they can provide low loss and low dispersion. Fibers are also useful over short distances for selected applications.

Optical fibers are thus finding use in a number of specialized applications such as long distance, secure, data links for military communications, data buses for satellite and space vehicle systems and real time imaging systems. Such imaging systems includes optical fiber systems for monitoring environmental and experimental conditions around nuclear reactor facilities, and optical fiber data links for plasma fusion reactors where extremely high electromagnetic fields can degrade electrical transmission systems.

Unfortunately, optical waveguides are damaged by exposure to ionizing radiation, such as x-rays, gamma rays or high energy particles. High purity silica core fibers usually display less damage than silicas with dopants in the core. For example, transmission of high purity silica core fibers can be degraded by several decibels per kilometer (dB/km) at 10 kilorad (krad) dose at a wavelength near 800 nanometers (nm). Fibers with extremely low-OH concentrations are required for long wavelength communication applications and are frequently more sensitive to radiation than high-OH materials. Although the increase in transmission loss diminishes with a relaxation period on the order of seconds to hours after irradiation ceases, some permanent damage remains in many types of fiber.

Hydrogen has been identified for over two decades as a significant factor in controlling the performance of silica materials in radiation environments. It has been previously demonstrated that radiation-induced attenuation in bulk silica samples can be reduced by introduction of hydrogen into the silica. Some of the earliest observations of hydrogen effects in fibers included the ease by which molecular hydrogen diffuses through the small dimensions of optical fibers and measurements demonstrated that increases in hydrogen concentration within the fiber core could lead to increased attenuation at certain wavelengths. Efforts have also been directed towards hermetically sealing the surface of optical fibers to significantly reduce diffusion of hydrogen.

In optical fibers, improved performance in ionizing radiation environments with introduction of hydrogen into the fiber was first noted by Nagasawa et al. in Japanese Journal of Applied Physics, vol. 24, pp. 1224–1228 (1985) where it was observed that hydrogen permeation into the fiber optic either prior to or following irradiation suppressed radiation-induced absorption.

Pre-irradiation of pure silica core optical fibers has been observed to frequently lead to improved performance in a subsequent radiation exposure (see, e.g., Lyons et al., SPIE, vol. 1174, pp. 2–19, 1990). Such a result may occur, for example, due to radiation-induced annealing whereby defects are effectively healed thru relaxation of neighboring lattice atoms into configurations resulting in stronger bonds, or in high-OH fibers, the radiation may itself release hydrogen, which could then diffuse to and bond into broken bonds. Other explanations may be possible.

While the previous efforts to provide radiation resistant optical fibers have made much progress, research has continued into this area. Combined treatments, with simultaneous pre-irradiation of hydrogen-impregnated fibers, have not yet been reported.

Accordingly, it is an object of this invention to provide a process of preparing optical fibers having enhanced radiation resistance utilizing a combined treatment with simultaneous pre-irradiation of a hydrogen-impregnated fiber.

SUMMARY OF THE INVENTION

To achieve the foregoing and other objects, and in accordance with the purposes of the present invention, as embodied and broadly described herein, the present invention provides a pre-treatment process which improves the radiation resistance of a pure silica optical fiber in subsequent radiation exposure, the pre-treatment process including two steps to be accomplished before the fiber is to be used in a radiation environment, i.e., maintaining an optical fiber within a hydrogen-containing atmosphere for sufficient time for hydrogen to permeate the fiber core thereby yielding an elevated internal hydrogen concentration, and irradiating the fiber while it has the elevated internal hydrogen concentration with a source of ionizing radiation, e.g., a cobalt-60 source.

DETAILED DESCRIPTION

Figure 1:
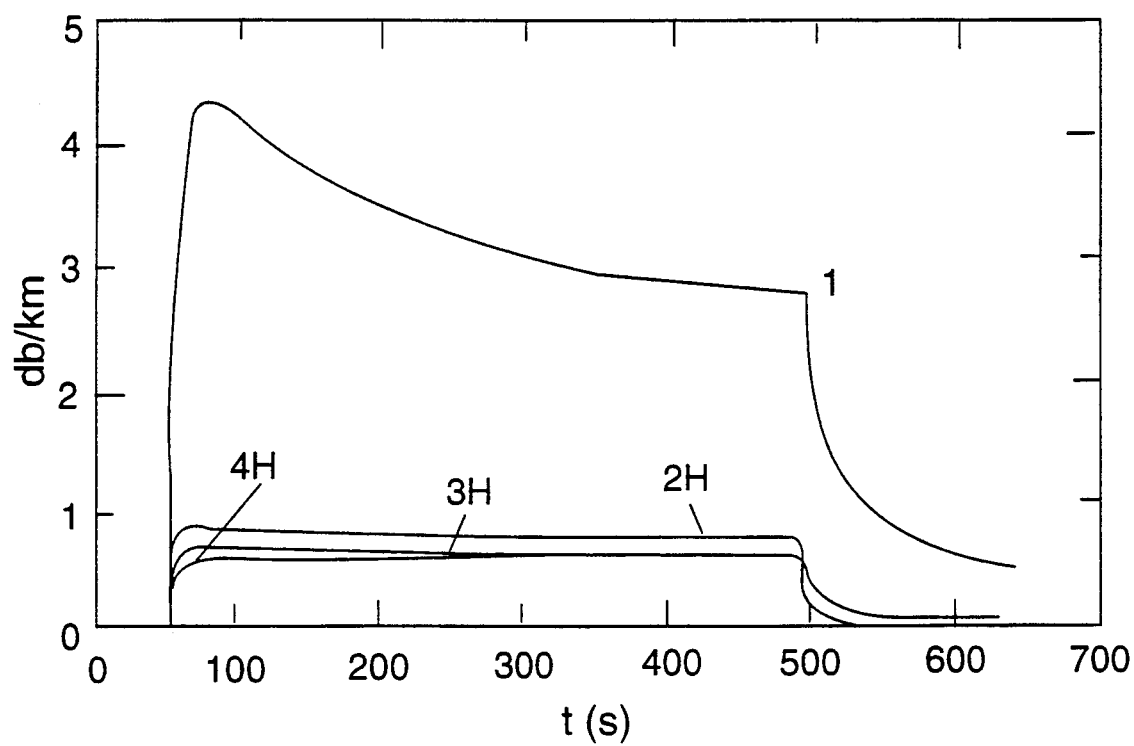
FIG. 1 is a graph of radiation-induced attenuation versus time (for a cobalt-60 source providing a dose rate of 21.7 rad/s) for a control optical fiber and three optical fibers pre-treated by the process of the present invention, i.e., irradiated while the fiber contained an elevated concentration of hydrogen.

The present invention concerns a process for preparing an optical fiber such that the fiber has enhanced radiation resistance.

In the present invention, the optical fibers typically include a pure silica core and a cladding material about the core. The silica core can be of a high-OH concentration material or may be of a low OH-concentration material. High-OH concentration generally refers to concentrations above about 100 parts per million (ppm), while low-OH concentration generally refers to concentrations below about 100 ppm.

The source for pre-irradiating the optical fiber should be capable of exposing the fiber to dose levels of 100 krads in a reasonable time period. Typically, cobalt-60 is used as the source for irradiation, although any source of penetrating ionizing radiation would be expected to provide equivalent performance. The pre-irradiation must occur while a high concentration of hydrogen is present in the fiber core.

The optical fibers are generally exposed to molecular hydrogen gas at pressures of several atmospheres. The hydrogen may also be in admixture with other gases since the permeability of hydrogen far exceeds other gases.

The optical fibers are generally exposed to the molecular hydrogen for periods sufficient to permit substantially elevated hydrogen concentrations to diffuse into the optical fiber silica core. This time depends on the temperature and diameter of the fiber. For typical 125 micron diameter fiber, 100 hours at a temperature of 100° C. is generally adequate. The optical fiber may also be treated with the hydrogen while still in the preform stage so long as the optical fiber retains an elevated hydrogen concentration in the subsequent irradiation stage of the present process.

The optical fiber can also include other coatings on the outside of the cladding present, e.g., a coating of a suitable polymer such as a polyimide or a polyacrylate. Such coatings are employed to minimize microbending losses. This coating must be readily permeable to hydrogen at the temperature employed, if the hydrogen is introduced in the fiber stage, to allow hydrogen to adequately permeate to the fiber core.

The process of the present invention provides enhanced radiation resistance or protection to the resultant optical fiber. The radiation resistance provided by this process generally has demonstrated a limited lifetime, although the lifetime of the effect may be extended by storage of the optical fibers at low temperatures. The process of the present invention may further provide enhanced UV protection to the resultant optical fiber.

The present invention is more particularly described in the following example and tables which are intended as illustrative only, since numerous modifications and variations will be apparent to those skilled in the art.

EXAMPLE 1

Two different batches of optical fiber were prepared for measurements. For each batch, a fluorosilicate clad preform with a high-OH Suprasil synthetic quartz core (such preforms available under the tradename Fluosil from Heraeus Quarzglas, GmbH in Hanau, Germany) was drawn by Polymicro Technologies, Inc. into a 100 micron core diameter fiber. The diameter including the cladding was about 110 microns. A thin polyimide buffer layer was applied (as described in Lyons et al., SPIE, Vol. 1174, pp. 2–19, 1990, such description incorporated herein by reference) to yield a final diameter of about 125 microns. Finally, an additional acrylate buffer layer was deposited to increase the fiber diameter to about 250 microns thereby reducing microbend sensitivity that was encountered without the thicker layer. Each batch of test samples was cut from a single length of optical fiber drawn from one preform.

The long single fiber was cut to lengths of about 200 meters (m). Several of these shorter length fibers were exposed to a 55 pounds per square inch (psi) hydrogen atmosphere at about 107° C. for about 100 hours. This time duration was considered adequate to guarantee a hydrogen concentration within the fiber close to equilibrium with the external hydrogen concentration. After this hydrogen permeation, the fibers were packed in dry ice to retard out-diffusion of the hydrogen and transported to a cobalt-60 source. After warming to room temperature, some fibers were promptly exposed to cobalt-60 doses at varying dosage levels. This completed the pre-treatment process. Details of fiber pretreatment are shown in Table 1.

All fibers were then stored at room temperature for seven days prior to subsequent tests to allow the majority of the interstitial hydrogen (calculated to be about 85%) to escape.

TABLE 1

| Fiber Sample Number pre-irradiation | Hydrogen exposure | Cobalt-60 |
| --- | --- | --- |
| 1 | no | none |
| 1H | yes | none |
| 2 | no | 1 krad |
| 2H | yes | 1 krad |
| 3 | no | 10 krad |
| 3H | yes | 10 krad |
| 4 | no | 50 krad |
| 4H | yes | 50 krad |

Radiation-induced attenuation was measured with a cobalt-60 source under conditions specified in the procedure described by NATO Nuclear Effects Task Group, "Procedures for Measuring Steady State Gamma Radiation-Induced Attenuation in Optical Fibers and Optical Cables," Los Alamos report number LA-UR-90-1901 (1990), such procedure incorporated herein by reference. A Laser Precision AP-4200 Stabilized Fiber Optic Light Source with an 850 nanometer (nm) AP418 laser output unit provided the illumination into a multimode pigtail connected to the test optical fiber. The output of the test optical fiber was connected to a Hewlett Packard 8152A Optical Average Power Meter whose output was measured with a Hewlett Packard 3457A Multimeter. The multimeter output were sampled on one second intervals under computer control and recorded. As described in the test procedure, input power was adjusted to be 1 microwatt. Output powers from the test samples were about 0.5 microwatts.

Test optical fibers were wound on a 10 centimeter (cm) diameter test spool and placed 38 cm from a 13 kilocurie (kCi) cobalt-60 source. Source output was measured with an EG&G, Inc. NIST-traceable 1 cubic centimeter (cc) air ionization chamber whose output was corrected for pressure and temperature. Dose in rads was obtained using 33.7 eV/ion pair in air and gamma ray attenuation coefficients for both $SiO_2$ and air in accordance with the U.S. Department of Health, Education, and Welfare, Radiological Health Handbook (1970). The resulting correction factor from Roentgen to rad($SiO_2$) was 0.869. Dose at the center of the fiber bundle was 21.66 rad/second (1300 rad/minute) after correction for spool and fiber attenuation. Fibers were irradiated to a 10 krad total dose.

Measured attenuations are shown in Table 2 and in FIGS. 1–4. Previous measurements of similar optical fibers have frequently shown a peak in the radiation-induced attenuation at low dose of a few hundred rads with an improvement, i.e., a decrease, in attenuation at higher doses. Such a phenomenon was observed in some of the present measurements and this peak attenuation is denoted by $a_{pk}$ in Table 2.

TABLE 2

| Fiber Sample Number | Dose [rad(SiO$_2$)] | | | | $a_{pk}$ |
|---|---|---|---|---|---|
| | 100 | 200 | 500 | 10$^4$ | |
| 1 | 3.25 | 4.06 | 4.35 | 2.73 | 4.36 |
| 1H | 2.51 | 3.09 | 2.99 | 0.83 | 3.17 |
| 2 | 2.32 | 3.04 | 3.34 | 2.39 | 3.35 |
| 2H | 0.73 | 0.85 | 0.88 | 0.74 | 0.87 |
| 3 | 1.27 | 1.68 | 1.98 | 2.35 | — |
| 3H | 0.57 | 0.67 | 0.70 | 0.64 | 0.70 |
| 4 | 1.29 | 1.87 | 2 58 | 3.25 | — |
| 4H | 0.47 | 0.55 | 0.63 | 0.61 | 0.63 |

Figure 4:
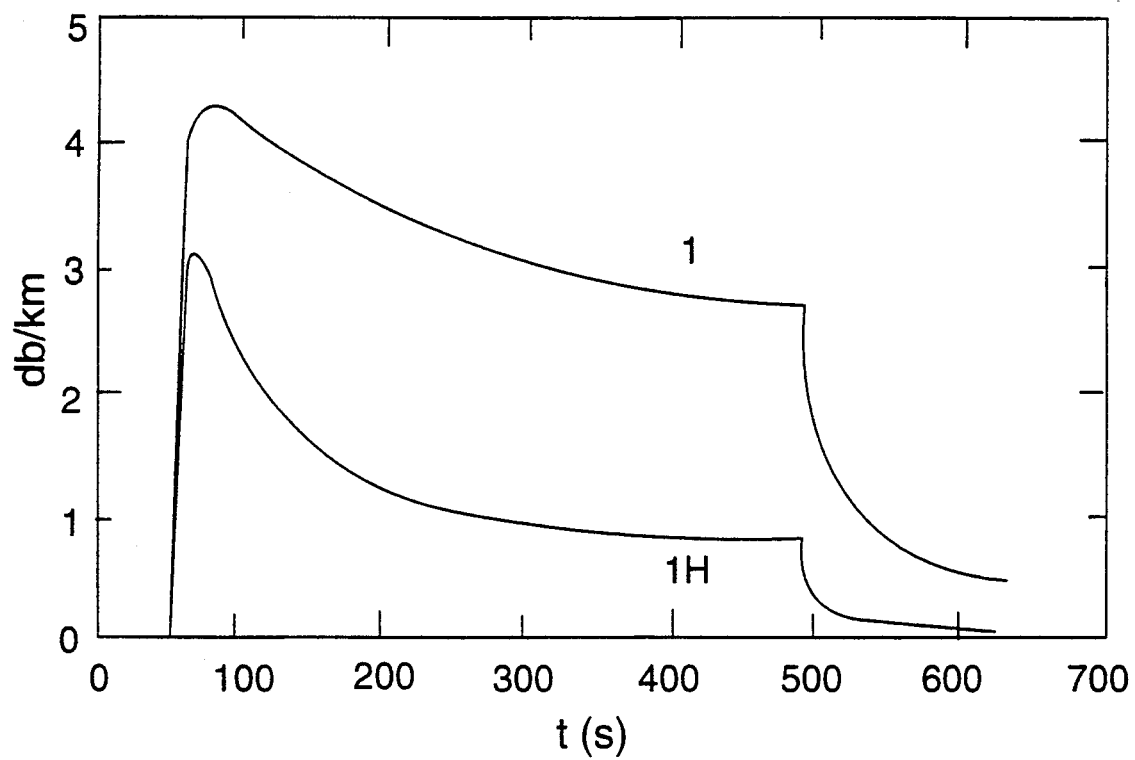
FIG. 4 is a graph of radiation-induced attenuation versus time (for a cobalt-60 source providing a dose rate of 21.7 rad/s) for a control optical fiber and an optical fiber treated only by exposure to hydrogen.

FIG. 4 compares the data from optical fibers 1 and 1H. These two fibers should have yielded equivalent performance, if all the hydrogen originally diffused into fiber 1H had diffused back out. The significant difference indicates that out-diffusion of the hydrogen had not been completed and that at least some residual hydrogen remained.

Figure 2:
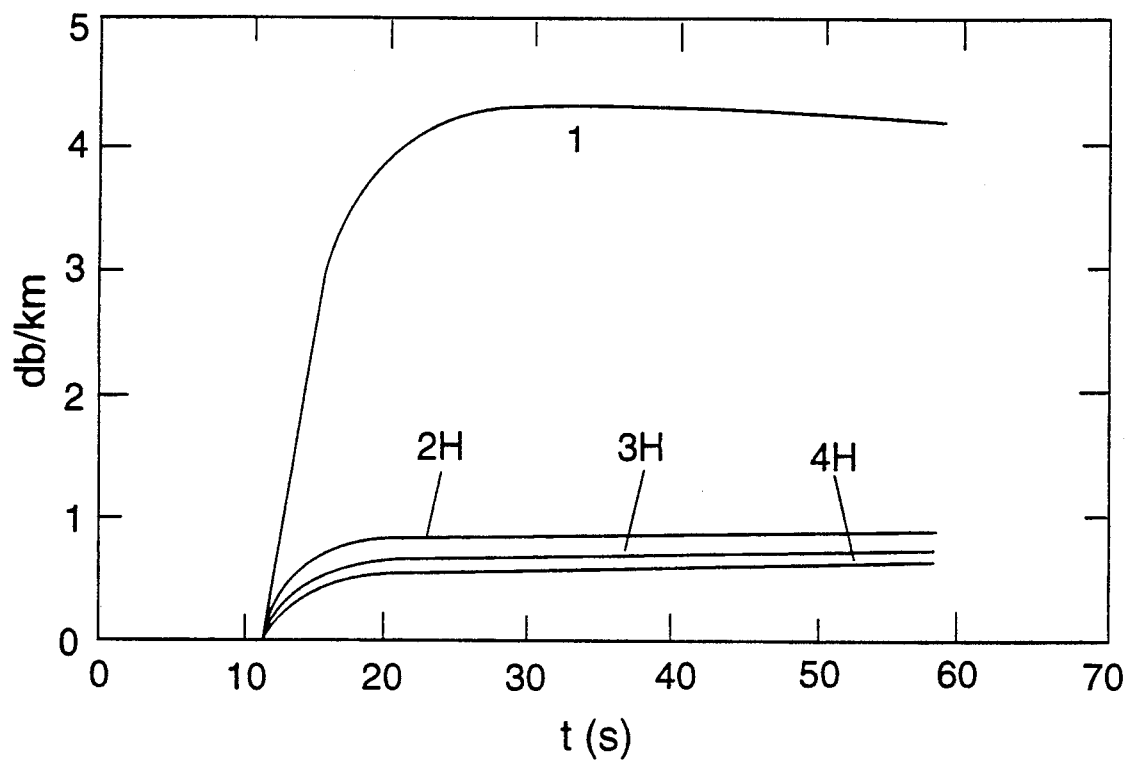
FIG. 2 is identical to FIG. 1, but with an expanded time scale.
Figure 3:
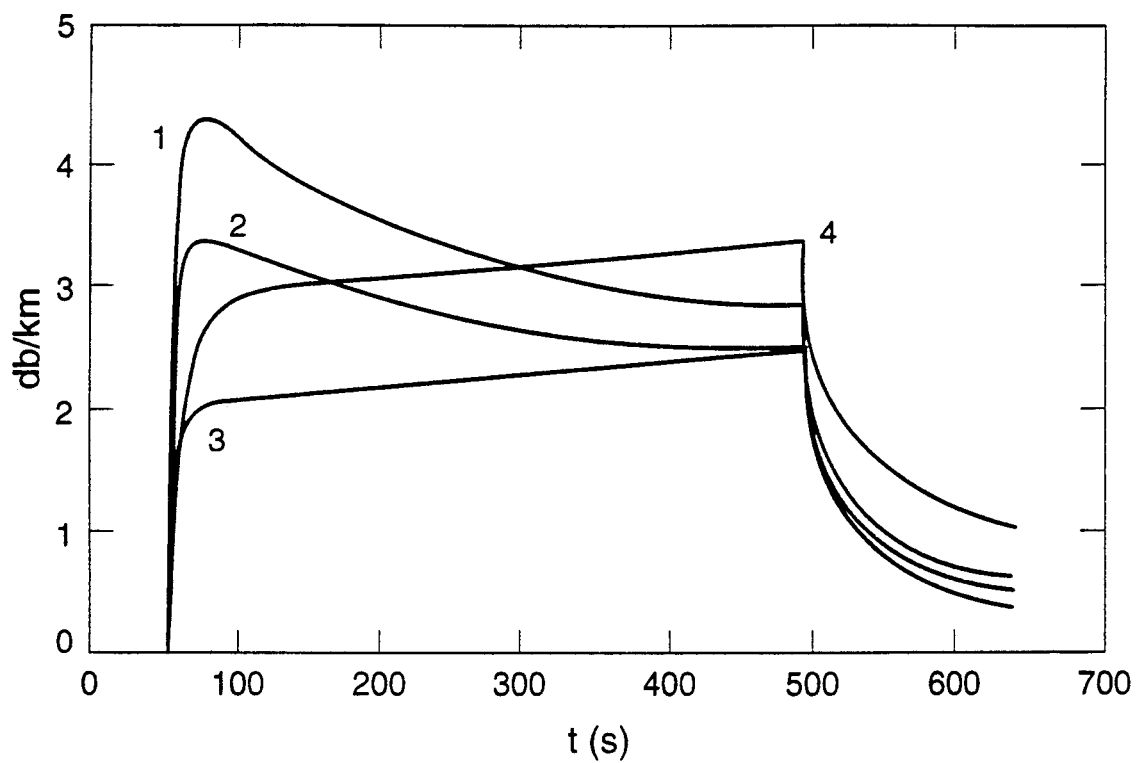
FIG. 3 is a graph of radiation-induced attenuation versus time (for a cobalt-60 source providing a dose rate of 21.7 rad/s) for a control optical fiber and three optical fibers treated only by pre-irradiation.

FIGS. 1 and 2 compare the data from optical fibers 1 and 2H, 3H and 4H. Dramatic improvement in radiation-induced attenuation was shown by fibers 2H, 3H and 4H over the control fiber 1 indicating the improvement attained by pre-irradiation of the fibers while significant levels of hydrogen were within the fibers. FIGS. 3 and 4 demonstrate that such an improvement in radiation-induced attenuation is not obtained by either pre-irradiation of the fiber or by treatment in a hydrogen atmosphere alone. Thus, the hydrogen plus irradiation pre-treatment of the present invention yields beneficial results with about eight times less attenuation at early times and few 100 rad doses.

Although the present invention has been described with reference to specific details, it is not intended that such details should be regarded as limitations upon the scope of the invention, except as and to the extent that they are included in the accompanying claims.

What is claimed is:

1. A process for producing an optical fiber comprising:
    maintaining an optical fiber within a hydrogen-containing atmosphere for sufficient time to yield a hydrogen-permeated optical fiber having an elevated internal hydrogen concentration; and,
    irradiating the hydrogen-permeated optical fiber at a time while the optical fiber has an elevated internal hydrogen concentration with a source of ionizing radiation.

2. The process of claim 1 wherein the fiber is pre-irradiated with a dose up to 1000 kilorads of radiation.

3. The process of claim 1 wherein the hydrogen-containing atmosphere has a hydrogen gas pressure of greater than one atmosphere and the optical fiber is maintained in the hydrogen-containing atmosphere for about 100 hours.

* * * * *